(12) United States Patent
Bottomley et al.

(10) Patent No.: US 7,899,015 B2
(45) Date of Patent: Mar. 1, 2011

(54) METHOD AND APPARATUS FOR RESOURCE REUSE IN A COMMUNICATION SYSTEM

(75) Inventors: Gregory E. Bottomley, Cary, NC (US); Jung-fu Cheng, Cary, NC (US); Havish Koorapaty, Cary, NC (US); Rajaram Ramesh, Raleigh, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 512 days.

(21) Appl. No.: 11/681,302

(22) Filed: Mar. 2, 2007

(65) Prior Publication Data

US 2008/0212539 A1    Sep. 4, 2008

(51) Int. Cl.
*H04B 7/216* (2006.01)

(52) U.S. Cl. ............ 370/335; 370/328; 370/329; 455/88; 455/450; 455/509

(58) Field of Classification Search ........... 370/329, 370/335, 345, 431, 465; 455/509, 450, 88, 455/452
See application file for complete search history.

(56) References Cited

U.S. PATENT DOCUMENTS

| | | | |
|---|---|---|---|
| 6,497,599 B1 * | 12/2002 | Johnson et al. | 455/447 |
| 6,868,277 B1 * | 3/2005 | Cerwall et al. | 455/509 |
| 7,072,315 B1 * | 7/2006 | Liu et al. | 370/329 |
| 2004/0120289 A1 * | 6/2004 | Hamalainen et al. | 370/335 |
| 2005/0117536 A1 * | 6/2005 | Cho et al. | 370/328 |
| 2005/0201447 A1 | 9/2005 | Cairns et al. | |
| 2005/0239460 A1 * | 10/2005 | Kroth et al. | 455/434 |
| 2006/0227741 A1 * | 10/2006 | Lappetelainen | 370/329 |
| 2007/0104254 A1 | 5/2007 | Bottomley et al. | |
| 2007/0160162 A1 * | 7/2007 | Kim et al. | 375/267 |
| 2007/0211662 A1 * | 9/2007 | Hyon et al. | 370/329 |

(Continued)

FOREIGN PATENT DOCUMENTS

EP    1432177 A2    6/2004

(Continued)

OTHER PUBLICATIONS

Bottomley, G. E. et al. "Method and Apparatus for Suppressing Interference Based on Channelization Code Power with Bias Removal." U.S. Appl. No. 11/566,756, filed Dec. 5, 2006. (Previously disclosed on Nov. 13, 2007 but Application failed to include a copy of the application.

(Continued)

*Primary Examiner* — Ricky Ngo
*Assistant Examiner* — Rasheed Gidado
(74) *Attorney, Agent, or Firm* — Coats & Bennett, PLLC.

(57) ABSTRACT

Method and apparatuses taught herein enable link adaptation feedback to be determined in advance for future transmit intervals, based on one or more data sending units sending indications of future transmit resource allocations, and receiving corresponding link adaptation feedback from data receiving units. Knowledge of the future transmit resource allocations enable individual data sending units to predict interference conditions for the future transmit interval, and thereby compute link adaptation feedback that takes advantage of low-interference conditions. Individual data sending units receive link adaptation feedback for the future transmit interval from the data receiving units they are supporting, and make corresponding link adaptations for the future transmit interval. Such operations are, in one or more embodiments, carried out in a Wideband Code Division Multiple Access (WCDMA), Long Term Evolution LTE), or WiMAX network, wherein the data sending units comprise radio base stations, and the data receiving units comprise wireless communication devices.

44 Claims, 4 Drawing Sheets

U.S. PATENT DOCUMENTS

2007/0254602 A1* 11/2007 Li et al. ............................ 455/88
2007/0298822 A1* 12/2007 Wan et al. ...................... 455/509

FOREIGN PATENT DOCUMENTS

| | | |
|---|---|---|
| GB | 2418102 A | 3/2006 |
| WO | 01/91322 A1 | 11/2001 |
| WO | 2004/042982 A2 | 5/2004 |
| WO | 2007/107944 A1 | 9/2007 |
| WO | WO 2008028507 A1 * | 3/2008 |

OTHER PUBLICATIONS

Co-pending U.S. Appl. No. 11/566,756, filed Dec. 5, 2006.

* cited by examiner

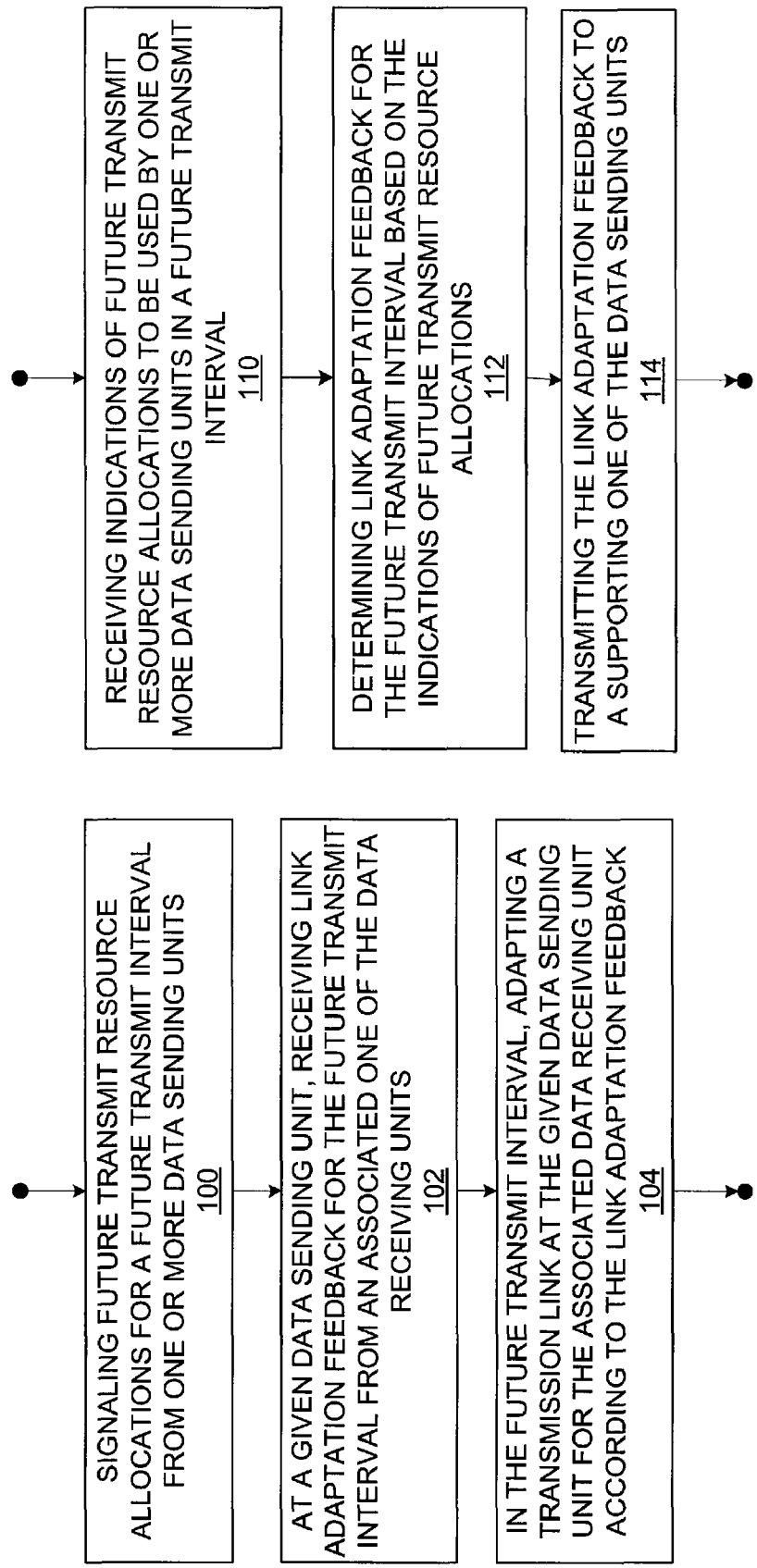

METHOD AND APPARATUS FOR RESOURCE REUSE IN A COMMUNICATION SYSTEM

BACKGROUND

1. Technical Field

The present invention generally relates to communication systems, such as cellular communication networks, and particularly relates to a method and system for statistically reusing resources, such as spreading codes or carrier tones, in communication systems.

2. Background

Current and developing wireless communication systems commonly employ transmit link adaptation, which varies one or more data transmission parameters in response to changing reception conditions. As one example, a remote receiver evaluates received signal quality, determines the received data rate it can support at that quality, and returns a corresponding data rate request to the originating transmitter. In response, the transmitter uses the requested data rate to adjust its next transmission to the receiver.

Implicit in such systems is the notion that the receiver's reception conditions during the time interval in which the transmitter uses the adapted data rate are the same (or close enough) to the reception conditions existent when the receiver made its signal quality determination. However, at least some current (and many developing network standards) provide high-speed packet data services in which packet data incoming to the network for delivery to remote receivers generally has a random arrival distribution. That is, for some transmit intervals, some network transmitters have little or no data to send, while others have large amounts of data to send.

Thus, the individual transmission activities for packet data within a given group of network transmitters may vary widely over successive transmission intervals. Compounding these activity variations, there is a tendency for given network transmitters to allocate significant transmit power and/or other transmit resources if there is packet data to send in any given interval, as a basis for sending data at the highest achievable rate within that interval. With that approach, the interference caused by a transmitter with respect to receivers operating in surrounding areas can vary dramatically over successive transmit intervals, as a function of whether the transmitter has packet data to send, and, if so, as a function of the transmit resource allocations made by the transmitter for sending that data.

To appreciate the challenges such circumstances present to receivers trying to determine link adaptation feedback, consider that a given receiver may compute received signal quality at a time instant where one (or more) nearby transmitters are actively sending packet data, meaning that the receiver's signal quality calculation reflects the potentially high levels of interference caused by the nearby, active transmitters. Thus, to the extent that those nearby transmitters are inactive (or otherwise transmitting with lower interface) during a later reception time, the level of interference experienced by the receiver will be lower and its previously calculated signal quality will be overly pessimistic for those conditions. Consequently, the receiver will be underserved during the low interference condition, to the extent that the receiver's supporting transmitter has adapted its transmission link to the receiver based on the previously calculated signal quality.

SUMMARY

Current and developing digital standards enable increasingly higher data rates, but achieving these higher rates in actual practice requires a method of transmit link adaptation that effectively exploits low interference conditions, such as when one or more neighboring transmitters are inactive for a given transmit interval. With the present invention, "predictive" link adaptation provides a basis for capitalizing on future conditions of expected low interference as part of the ongoing transmit link adaptation process. As one example set in the non-limiting context of High Speed Downlink Packet Access (HSDPA) services in a Wideband Code Division Multiple Access (WCDMA) wireless communication network, mobile stations are notified about how nearby data sending units 10 plan to use transmission resources in one or more future transmit intervals, thereby allowing the mobile stations to know with greater accuracy the data rate they can request for service during the future transmit interval(s).

Broadly stated, methods and apparatuses taught herein provide for predictive link adaptation, wherein data sending units provide indications of their transmit resource allocations for a future time interval, and the data receiving units correspondingly use that beforehand knowledge to determine link adaptation feedback in advance of the future time interval. In at least one embodiment, a method of link adaptation in a wireless communication network includes signaling future transmit resource allocations for a future transmit interval from one or more data sending units, so that nearby data receiving units can consider the future transmit resource allocations in their interference-based determinations of link adaptation feedback for the future transmit intervals. In complementary fashion, the method also includes, at a given data sending unit, receiving link adaptation feedback for the future transmit interval in advance from an associated one of the data receiving units and, for the future interval, adapting a transmission link at the given data sending unit for the associated data receiving unit according to the link adaptation feedback.

In at least one embodiment, for a given data sending unit, signaling future transmit resource allocations comprises transmitting an indication of whether the data sending unit will be active with respect to one or more types of transmission in the future transmit interval. In one or more embodiments, signaling future transmit resource allocations for a future transmit interval from one or more data sending units comprises, for each of one or more of the data sending units, transmitting an indication of whether one or more data sending units will be transmitting in the future transmit interval. Correspondingly, in one or more embodiments, data receiving units are configured to determine link adaptation feedback for the future transmit interval based on considering or not considering an interference contribution of the individual data sending units according to the corresponding indications of whether the data sending unit will be active.

Of course, in one or more other embodiments, the data sending units signal future transmit resource allocations in more detail, such as by transmitting information about channelization resource allocations, e.g., information regarding channelization codes and/or carrier frequencies. Such information may include, for example, code and/or frequency assignments for particular types of transmit channels, and may include information regarding the transmit power allocations, data rates, etc., for given channelization resources.

With more detailed information about the future transmit resource allocations, individual data receiving units can determine link adaptation feedback for the future time interval by predicting interference conditions for the future transmit interval. In at least one embodiment, a data receiving unit method includes estimating interference contributions of individual data sending units (for the future transmit interval)

according to the corresponding channelization resource allocation information. For example, an individual data receiving unit can be configured to estimate interference conditions for the future transmit interval by determining signal impairment cross-correlations based on knowledge of the corresponding channelization code or channelization frequency allocations.

Of course, the present invention is not limited to the above features and advantages. Indeed, those skilled in the art will recognize additional features and advantages upon reading the following detailed description, and upon viewing the accompanying drawings.

BRIEF DESCRIPTION OF THE DRAWINGS

FIG. 2 is a logic flow diagram for one embodiment of a data sending unit method for predictive transmit link adaptation as taught herein.

FIG. 3 is a logic flow diagram for one embodiment of a data receiving unit method for supporting predictive link adaptation as taught herein.

DETAILED DESCRIPTION

Figure 1:
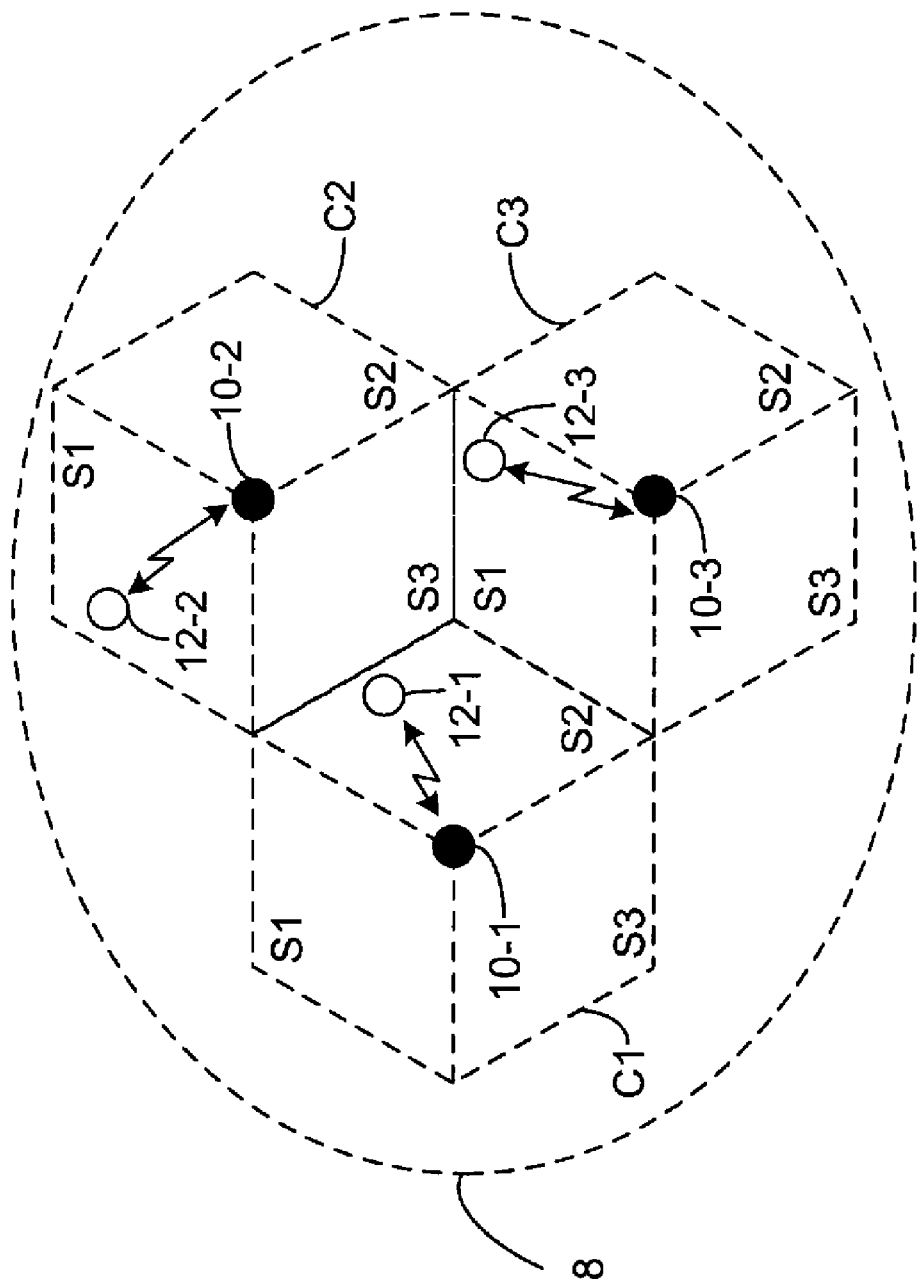
FIG. 1 is a block diagram of one embodiment of a wireless communication network having multiple data sending units for providing communication services to one or more data receiving units.

As a non-limiting context for discussing "predictive" transmit link adaptation as taught herein, FIG. 1 illustrates a wireless communication network 8, which includes a number of data sending units 10, each configured to support communication with one or more (remote) data receiving units 12. According to methods and apparatuses taught herein, one or more of the data sending units 10 signal future transmit resource allocations for a future transmit interval, thereby enabling appropriately configured ones of the data receiving units 12 to determine link adaptation feedback for that future transmit interval based on knowledge of the future transmit resource allocations.

In other words, a given data receiving unit 12 is provided advance information regarding the transmit resource allocations to be used at one or more of the data sending units 10. In particular, it is useful for a given data receiving unit 12 to receive future transmit allocation information from nearby data sending units 10, because the transmit activities at those data sending units 10 are likely to contribute significantly to variations in reception interference at the given data receiving unit 12.

For example, continuing with the non-limiting context illustrated in FIG. 1, a data sending unit 10-1 provides service in a cell C1, having a number of service sectors S1-S3. Likewise a data sending unit 10-2 provides service in sectors S1-S3 of cell C2, while a data sending unit 10-3 provides service in sectors S1-S3 of cell C3. In practice, however, the cells/sector coverage overlaps, such that a data receiving unit 12-1 operating in sector S2 of cell C1 may be supported by the data sending unit 10-1, but it "hears" interfering transmissions from one or more of the nearby data sending units 10-2 and 10-3. More particularly, transmissions in the other cells/sectors represent a potentially significant source of interference for the reception of signals transmitted from the data sending unit 10-1 to the data receiving unit 12-1. In general, each data sending unit 10 causes other cell/sector interference with respect to surrounding data receiving units 12.

However, in any given transmit interval, whether and to what extent a nearby data sending unit 10 causes interference at a given data receiving unit 12 depends on the particular transmit activity of that data sending unit 10 during the given transmit interval. For example, certain channelization resources, such as channelization codes, channelization time slots, and/or channelization frequencies may be reused across the data sending units 10. Thus, the extent to which neighboring data sending units 10 simultaneously transmit different information using the same channelization resources represents a significant factor bearing on the amount and nature of reception interference experienced by a given data receiving unit 12 that is in range of the (potentially) interfering data sending units 10.

Regarding the point that any given one of the data sending units 10 represents a potentially significant source of interference to data receiving units 12 supported by data sending units 10 in other cells/sectors, one embodiment taught herein relates to the transmit power used to signal the future transmit resource allocations. More particularly, at least one embodiment taught herein includes signaling future transmit resource allocations using a signal power greater than that allocated to other control signals transmitted by the data sending unit 10. Doing so enhances reception of the signal for those data receiving units 12 outside of conventional signaling reception but still subject to interference caused by the data sending unit 10. In other words, a given data sending unit 10 can be configured to transmit indications of future resource allocations using a relatively high signal power (as compared to other control/overhead channel signaling), so that data receiving units 12 in nearby cells/sectors receive such information with improved reliability.

With these and other operational possibilities in mind, FIG. 2 outlines a broad embodiment of a method of link adaptation in a wireless communication network that can be carried out by appropriately configured ones of the data sending units 10. With respect to a given data sending unit 10, the method "begins" with the data sending unit signaling future transmit resource allocations for a future transmit interval (Step 100). In a WCDMA embodiment, for example, the data sending unit 10 can be configured to schedule transmissions to supported users (data receiving units 12) over a series of Transmit Time Intervals (TTIs). Thus, signaling future transmit resource allocations comprises, in at least one embodiment, the data sending unit 10 signaling an indication of transmit resource allocations to be used by the data sending unit 10 in a future TTI.

The method continues with the data sending unit 10 receiving link adaptation feedback for the future transmit interval from an associated one of the data receiving units 12 (Step 102), e.g., the data sending unit 10 receives link adaptation feedback for the future transmit interval from a data receiving unit 12 being supported by the data sending unit 10. The link adaptation feedback is determined by the data receiving unit 12 for the future transmit interval as a function of the future transmit resource allocation information received from one or more data sending units 10 for the future transmit interval in question. In general, the ability of a given data receiving unit 12 to compute link adaptation feedback for the future transmit interval improves with the number of nearby data sending units 10 for which information regarding the future transmit resource allocations to be used in the future transmit interval is received.

The link adaptation feedback itself may comprise essentially any type of feedback that enables the data sending unit 10 to adapt its transmissions to the data receiving unit 12 in response to changing reception conditions. In a non-limiting example, the link adaptation feedback comprises data rate requests, determined by the data receiving unit 12 as a function of received signal quality, or the like. In another non-limiting example, the link adaptation feedback comprises signal quality measurements and/or channel quality indicators that, likewise, can be used by the data sending unit 10 to determine the appropriate transmission link parameters to use when transmitting data to the data receiving unit 12 in the future transmit interval. In another non-limiting example, the link adaptation feedback comprises resource preference information, such as preferred codes or frequency assignments.

Regardless of the particular type or format adopted for the link adaptation feedback, the data sending unit 10 adapts the transmission link in the future transmit interval for the associated data receiving unit 12 according to the link adaptation feedback (previously) received from the data receiving unit 12 for that future transmit interval (Step 104). As a non-limiting example, link adaptation comprises formatting the data for transmission to the data receiving unit directly or indirectly according to the link adaptation feedback. Data formatting may comprise the selection of a data rate and/or a modulation format. More generally, then, the data sending unit 10 selects a modulation and coding scheme ("MCS") for transmitting to a given data receiving unit 12 in a future transmit interval of interest, based on the link adaptation feedback received from that data receiving unit 12 for that future transmit interval of interest.

In further refinements of the general method illustrated in FIG. 2, the data sending units 10 may be configured to synchronize their transmit intervals. That is, the method may further include synchronizing transmit intervals across the one or more data sending units 10, such that the future transmit interval occurs substantially synchronously across the data sending units 10. As a non-limiting example, a given group of data sending units 10, e.g., a set of neighboring data sending units 10, may operate with synchronized transmit intervals based on sharing a common reference timing, such as a Global Positioning System (GPS) based reference timing. Of course, those skilled in the art will recognize other mechanisms for synchronizing data sending unit operations.

Further, if two or more of the data sending units 10 in a given area are not synchronized, then a transmit interval of interest at a given data sending unit 10 may partially overlap with two transmit intervals of interest at the other data sending unit 10. For example, in a WCDMA embodiment, the TTI of a given data sending unit 10 may overlap in time with two TTIs of another data sending unit 10. Thus, for a given data receiving unit 12, it would be helpful to know whether that other data sending unit 10 will be active in either or both of the TTIs of concern. Thus, the signaling of future transmit resource allocations for a future transmit interval may, at any one or more of the data sending units 10, comprise sending signaling relating to more than one future transmit interval. The number of future transmit intervals for which future transmit resource allocations information is sent can be set according to the maximum extent that transmit intervals can be misaligned across the data sending units 10.

With that, a given data receiving unit 12 can estimate a relative timing offset and estimate the effective interference for a future transmit interval of interest as a weighted sum of the two (interfering) transmit interval interference levels, using weighting factors equal to the fraction of time the interfering intervals will overlap with the future transmit interval of interest. If signaling information is unavailable for one or more interfering intervals, the data receiving unit 12 can account for such interference using nominal or worst case values or weightings.

With the possibility of such added refinements in mind, it should be understood that one or more of the data sending units 10 signal their future transmit resource allocations for corresponding future transmit intervals. Such signaling can be conducted on an ongoing basis, using one or more control, signaling, or broadcast channels generally transmitted by the data sending unit 10. Alternatively, one or more data sending units 10 can share information regarding their future transmit resource allocations, such that a given data sending unit 10 can transmit information regarding the future transmit resource allocations to be made at more than one data sending unit 10.

Irrespective of whether the data sending units 10 carry out individual or shared transmissions, one embodiment of signaling future transmit resource allocations for a future transmit interval from one or more data sending units comprises transmitting an indication of whether a given data sending unit 10 will be transmitting in the future transmit interval. That is, the indication of future transmit resource allocations sent by each of one or more data sending units 10 can be as simple as an "activity flag" or other indicator, indicating whether the given data sending unit 10 will or will not be active in a corresponding future transmit interval.

More particularly, one or more of the data sending units 10 can be configured to transmit such indications on an ongoing basis, wherein each indication identifies whether the data sending unit 10 will or will not be transmitting in the corresponding future transmit interval, at least with respect to one or more types of transmission. For example, HSDPA and other types of high-rate packet data services have the potential to cause significant interference, so the one or more data sending units 10 may use their transmit resource allocation signaling simply to indicate whether such services will or will not be active in a corresponding future transmit interval. The advantage of such signaling is, obviously, the small amount (1 bit) of information needed to convey the active/inactive transmit condition for the future transmit interval.

Of course, if the transmit resource allocation information signaled by the data sending units 10 is more detailed, the data receiving units 12 can be configured to make richer, more detailed use of it. For example, if a data sending unit 10 signals its future transmit resource allocations in simple terms, i.e., resources will or will not be allocated for one or more types of transmissions in the future transmit interval (on/off or active/inactive signaling), then a given data receiving unit 12 may base its determination of link adaptation feedback for the future transmit interval by considering or not considering an interference contribution of respective data sending units 10, according to the corresponding indications. However, in at least one other embodiment, signaling future transmit resource allocations for a future transmit interval from one or more data sending units 10 comprises transmitting channelization resource allocation information corresponding to channelization resource allocations to be used by the one or more data sending units 10 in the future transmit interval. Transmitting channelization resource information as the signaled indications of future transmit resource allocations comprises, in one or more embodiments, sending any one or more of channelization code allocation information, channelization frequency allocation information, and channelization time slot allocation information.

For example, a given data sending unit 10 can transmit information regarding the channelization codes to be used for one or more types of transmissions during the future transmit interval, e.g., code assignments and transmit data rates and/or power allocation information. Similarly, in an OFDM embodiment, for example, the frequency (subcarrier) assignments, data rate and/or power allocation information can be sent.

Regardless of whether simple indications or rich indications are sent regarding the allocations of future transmit resources, any one or more of the data sending units 10 can be configured to determine its future transmit resource allocations based on a (user) scheduling objective biased toward improving service to data receiving units 12 in disadvantaged reception conditions. In one embodiment, a data sending unit 10 is configured to improve data rates for data receiving units 12 in disadvantaged locations (i.e., locations of poor reception performance) by trading off performance of users in more advantaged locations. In particular, a data sending unit 10 can be configured to implement a strategy wherein it chooses to transmit using lower power or other resource allocations for users that are known to be in advantageous locations.

The data sending unit 10 thus may use these "reclaimed" resources for bettering service to the disadvantaged users. Additionally, by reducing the power and/or other transmit resources allocated to the more advantaged users, the tendency for service to those users to interfere with users in surrounding areas decreases. That is, as one example, if a given one of the data sending units 10 adopts a scheduling algorithm that serves advantaged users at a lower data rate than their conditions can support, then the transmissions to those users generally cause less interference with respect to users in the surrounding areas. Thus, adopting such an allocation strategy for the transmit resources tends to increase the signal quality, e.g., SINR, of disadvantaged users in other cells/sectors, thereby allowing those users to be better served by their respective data sending units 10.

Irrespective of whether the above disadvantaged-user provisions are incorporated into the scheduling algorithms of the respective data sending units 10, each data sending unit 10 can be configured to determine its future transmit resource allocations based on knowledge of radio conditions for associated ones of the data receiving units 12. That is, a given data sending unit 10 can, on an ongoing basis, determine future transmit resource allocations for corresponding future transmit intervals based on its knowledge of the radio conditions reported by the data receiving units 12 that are candidates for being served in the future transmit interval(s). Such radio condition knowledge may be gleaned directly or indirectly from the link adaptation feedback provided to the data sending unit 10 by the data receiving units 12 being supported by it.

Complementing the transmission of information regarding future transmit resource allocations by one or more of the data sending units 10, FIG. 3 illustrates one embodiment of a complementary method of supporting link adaptation in a data receiving unit 12 that is configured for operation in a wireless communication network having multiple data sending units 10. The illustrated method comprises receiving indications of future transmit resource allocations to be used by one or more data sending units 10 in a future transmit interval (Step 110). As noted, ideally, the data receiving unit 12 receives indications of future transmit resource allocations for each data sending unit 10 in the surrounding area. However, the methods and apparatus taught herein provide operational advantages if such information is received from any one or more of the data sending units 10 prone to interfere with signal reception at the data receiving unit 12. Note, too, that the individual data sending units 10 each may broadcast or otherwise send their future transmit resource allocations information on an individual basis. Alternatively, they may share such information between them, such that a given data sending unit 10 signals future transmit resource allocation information for one or more other data sending units 10, in addition to, or in alternative to, signaling such information for itself. This may be preferred from an interference point of view.

In any case, the data receiving unit 12 receives information regarding the future transmit resource allocations to be used at one or more of the data sending units 10 that are nearby it, and uses that information to determine link adaptation feedback for the future transmit interval (Step 112). As noted, the link adaptation feedback determination may comprise determining a data rate request, determining a signal quality measurement, determining a channel quality measurement, or determining essentially any type of value that indicates to the supporting data sending unit 10 how the transmission link should be adapted in the future transmit interval. The illustrated processing ends with the data receiving unit 12 transmitting the link adaptation feedback, for receipt at one or more of the data sending units 10 (Step 114). Such transmission is done in advance of the future transmit interval, so that a supporting one of the data sending units 10 can subsequently use the feedback in the future transmit interval to make the appropriate link adaptations for the data receiving unit 12.

In one or more detailed embodiments of the above broad method, receiving indications of future transmit resource allocations to be used by one or more data sending units 10 in a future transmit interval comprises receiving an indication of future transmit resource allocations for the future transmit interval from each in a number of data sending units 10. Correspondingly, determining link adaptation feedback for the future transmit interval based on the indications of future transmit resource allocation comprises predicting interference conditions for the future transmit interval based on the indications of future transmit resource allocations.

In at least one such embodiment, the indications of future transmit resource allocations comprise, for each of one or more data sending units 10, an indication of whether the data sending unit 10 will be active with respect to one or more types of transmission in the future transmit interval. With such indications, the data receiving unit 12 predicts interference conditions for the future transmit interval based on the indications of future transmit resource allocations by considering or not considering an interference contribution of individual data sending units 10 according to the corresponding indication of whether the data sending unit 10 will be active.

To support interference estimation, in at least one embodiment, the indications of future transmit resource allocations comprise, for each of one or more data sending units 10, channelization resource allocation information for the future transmit interval. With such information, the data receiving unit 12 can be configured to predict interference conditions for the future transmit interval by estimating interference contributions of individual data sending units 10 according to the corresponding channelization resource allocation information. In other words, more detailed information about the transmit resource allocations to be used at one or more of the (nearby) data sending units 10 in the future transmit interval provides a basis for more accurate or sophisticated interference estimation.

Thus, determining link adaptation feedback for the future transmit interval based on the indications of future transmit resource allocation may, at any one or more of the data receiving units 12, comprise estimating interference contributions of each data sending unit 10 in a number of data sending units 10. Such estimations for the future transmit interval are based on the corresponding channelization resource allocation information received from the respective data sending units 10 for that future transmit interval.

In at least one such embodiment, the channelization resource allocation information comprises at least one of channelization code allocations and channelization frequency allocations. With that, estimating interference contributions of each data sending unit 10 in the number of data sending units 10 for the future transmit interval comprises determining signal impairment cross-correlations based on knowledge (at the data receiving unit 12) of the corresponding channelization code or channelization frequency allocations. In turn, the data receiving unit 12 uses its estimations of impairment cross-correlation to compute the link adaptation feedback, which may be represented as signal quality measurements, channel quality indicators, data rate requests, or the like.

With FIGS. 2 and 3 in mind, one may assume for example that the data sending units 10 comprise radio base stations and that the data receiving units 12 comprise wireless communication devices, such as cellular radio telephones or the like. Within that context, one general aspect of the teachings herein is to have the data sending units 10 broadcast information related to what transmission resources they will use in a future transmit interval. For example, downlink transmissions between the data sending units 10 and the data receiving units 12 may be logically divided into successive TTIs in a WCDMA embodiment of the wireless communication network 8. Thus, in advance of any given TTI, one or more data sending units 10 signal future transmit resource allocations for the forthcoming TTI. In return, a given data receiving unit 12 then uses the received transmit resource allocation information, along with a way for accounting for interference from each data sending unit 10, to determine a more accurate estimate of a signal-to-interference-plus-noise ratio (SINR) expected for the upcoming TTI.

Thus, SINR estimation for a future transmit interval based on received knowledge of the transmit resource allocations to be used by nearby data sending units 10 in that upcoming transmit interval represents a notable aspect of the teachings herein, at least for the currently described embodiment. More particularly, a data receiving unit 12 can use the future transmit resource allocation information to better determine the maximum data rate that can be supported by it in the future transmit interval, and correspondingly send link feedback adaptation to its supporting data sending unit 10, directly or indirectly requesting that rate for the future transmit interval. In response, the supporting data sending unit 10, if possible, uses that rate in the future transmit interval to send data to the wireless communication device As noted before, in at least one embodiment, the signaling can be as simple as one control bit that indicates whether a packet will be sent by the given data sending unit 10 in the future transmit interval. This sort of active/inactive signaling is suitable, for example, for communication systems where the data sending unit 10 always uses the same power when sending data and uses a different power level when only control information (and possibly circuit switched data such as voice) is sent. In such a system, data receiving units 12 can learn what power level is used by the data sending unit 10 when sending packet data and what power level is used otherwise. For example, data sending units 10 could transmit such information for receipt by nearby data receiving units 12. (It is a safe assumption that a given data receiving unit 12 could receive such information, at least from a nearby, dominant interfering data sending unit 10.)

In another embodiment, more bits of information regarding how much power will be used may be sent by a data sending unit 10. For example, bits can be sent indicating either how much more power will be used than is currently being used or what fraction of some nominal (maximum) power level will be used. Sending power levels is useful for systems where the data sending units 10 may transmit data with varying power levels with power being spread over the entire bandwidth. For example, in HSDPA systems, some fraction of the sixteen channelization codes available for HSDPA services may be used with lower power. Similarly, in an OFDM system, only some of the available tones (sub-carriers) may be used with the used tones being spread across the entire bandwidth in some randomized fashion, so that the interference from other data sending units 10 is randomized.

As a general proposition herein for conventional WCDMA transmission and reception, it may be sufficient for the data receiving units 12 to know the power level one or more of the data sending units 10 will use, either for the packet data or for the total transmission (data+voice). However, for a data receiving unit 12 with an advance receiver design, it may also help to know what channelization codes (spreading codes) will be used, and possibly the power allocated to them. For example, advanced receivers which use spreading code knowledge of interfering signals can determine a more accurate signal quality measure, such as SINR, using knowledge of which codes will be used and at what power level. Similarly, in an OFDM system where the data tones may occupy contiguous parts of the channel bandwidth, known as "chunks," some types of receiver can evaluate SINR more accurately if information regarding the power level from interfering base stations in each of the chunks used for sending data to the receiver is signaled.

Accordingly, in at least some embodiment taught herein, one or more data sending units 10 broadcast the power to be transmitted in a future transmit interval, along with corresponding information about the specific time/frequency/code/tone resources where that power will be concentrated. Such information allows a data receiving unit 12 to compute SINR values for its channel allocation much more precisely, while providing scheduler entities in the data sending units 10 with more flexibility in using resources. With scheduler flexibility, for example, an OFDM-based data sending unit 10 may choose to concentrate power for a given user in tones where the channel conditions are good.

As for using the future transmit resource allocation at a given data receiving unit 12 to predict the SINR ratio for the future transmit interval, that can be done by measuring separate interference levels for each interfering data sending unit 10 and then using these measurements with the signaling information to predict SINR. Thus, a given data receiving unit 12 needs a way to distinguish interfering sources. For embodiments that provide HSDPA services, distinguishing interfering sources can be done at a data receiving unit 12 by using a form of parametric Generalized Rake (G-Rake) received signal processing. With G-Rake receiving processing, the impairment covariance (across a number of signal despreading fingers) is modeled by multiple terms corresponding to different ones of the interfering data sending units 10.

Further, SIR (SINR) can be estimated by the data receiving unit 12 using a parametric estimation of the impairment covariance, wherein the data receiving unit 12 omits or scales certain impairment/interference terms based on the signaled future transmit resource allocation information. For example, the impairment contribution of a data sending unit 10 that signals it will be inactive in the future transmit interval can be omitted from consideration. Similarly, impairment contributions for different base stations can be weighted according to signaled transmit powers.

Specifically, consider a data receiving unit 12 employing parametric G-Rake reception as described in the U.S. patent application entitled, "Method and apparatus for parameter estimation in a generalized RAKE receiver," as filed on 12 Mar. 2004 and assigned application Ser. No. 10/800,167. The data receiving unit 12 normally estimates SIR using $$SIR = h^H R^{-1} h \qquad \text{Eq. (1)}$$

where the "H" operator denotes the hermitian transpose, the h term represents the channel estimates (e.g., "net" channel estimates, including transmit/receiving filter effects), and the $R^{-1}$ term represents the inverse matrix of the cross-finger impairment covariance matrix R.

In at least one embodiment, the G-Rake receiver embodiment of the data receiving unit 12 is configured to calculate the impairment covariance matrix R as, $$R = \sum_j \alpha_j R_j + \beta R_n \qquad \text{Eq. (2)}$$

At the given data receiving unit 12, the above summation is taken over interfering data sending units 10, including the own-cell data sending unit 10. The last term on the right in Eq. (2) models remaining interference and noise. The scaling factors ($\alpha_j$) scale a normalized model covariance for each data sending unit 10 (index j) and are related to the total data sending unit power as seen at the data receiving unit 12. The situation in soft handoff between two data sending units 10 and/or with two receive antennas is similar.

Consider the embodiment in which each data sending unit 10 employs two power levels: a maximum level when it has an HSDPA packet to send and a nominal level when there is no HSDPA packet to send. In the context of Eq. (2), it is known to estimate two a terms for each data sending unit 10, each such term associated with one of the two transmit power states. Thus, dependent on the signaling as to which state the data sending unit 10 will be in, the data receiving unit 12 could use the appropriate a to determine R. In such cases, the signaling from data sending units 10 can be simply one bit. The signaling can also be "remembered" at individual data receiving units 12, to know which a to update later and thereby further saving bits needed for signaling.

Alternatively, consider an embodiment in which the data sending units 10 provide richer signaling information about their transmit resource allocations planned for a future transmit interval. For example, a given data sending unit 10 might signal the fraction of power it plans to use in the next TTI. In this case, a data receiving unit 12 receiving such information can estimate the impairment correlation matrix R as, $$R = \sum_j f_j \alpha_j R_j + \beta R_n \qquad \text{Eq. (3)}$$

where $f_j$ indicates the fraction of power to be used. In this case, the $\alpha_j$ terms correspond to the maximum power situation and there is only one such term per data sending unit 10. These can be updated each time new future transmit resource allocation information is received, using the parametric G-Rake approach and folding the $f_j$ into the fitting equations used for parametric modeling. Note that when $f_j$ or $f_j R_j$ is small in some sense, such as the trace, then the effect of the update can be made less.

A similar process can be used for embodiments where the data sending units 10 advertise spreading code, tone and/or power allocation information for future transmit intervals. That is, such information can be used to form a code-specific parametric R matrix or other code-specific quantities such as those used in multi-user detection, which can then be used to estimate SIR and perform transmit link adaptation.

As for sending data from the data sending units 10 to respective ones of the data receiving units 12 in accordance with the transmit link adaptation, individual data sending units 10 queue data packets received from the wireless communication network 8 for delivery to corresponding ones of the data receiving units 12. In at least one embodiment, the data sending units 10 can split up these higher layer packets into smaller chunks that can fit into defined resource blocks according to the particular air interface protocol being used.

Thus, the radio and, possibly, other transmit resources to be used at a given data sending unit 10 in a future transmit interval (such as power level, spreading codes and tones) are estimated by it based on the amount of data queued for delivery to data receiving units 12 and recent data rate requests from those data receiving units 12. The data sending unit 10 then signals the transmit resource allocation planned for the future transmit interval, such as by broadcasting or otherwise transmitting on an overhead or common channel. As a general point of operation, data sending units 10 make actual transmit resource allocations in any given transmit interval according to the previously signaled allocation information, i.e., once a data sending unit signals information about the transmit resource allocations it intends for future transmit intervals, it generally adheres to its signaled allocations as those future transmit intervals come to pass. Of course, some deviations from previously signaled allocations may be necessary, as those skilled in the art will recognize.

Those skilled in the art should also recognize that the transmit resource allocations planned by a data sending unit 10 for a given future transmit interval are not necessarily allocated to any particular data receiving units 12 at the point where the planned allocation is signaled. Rather, in at least one embodiment, the data sending units 10 are configured to signal future transmit resource allocations, receive corresponding link adaptation feedback from their associated data receiving units 12, and then make specific (sub) allocations of the planned resources to particular ones of the data receiving units 12. Such allocations may be in accordance with overall scheduling objectives at each data sending unit 10, which may consider maximum throughput criteria, proportional fairness criteria, minimum Quality-of-Service (QoS) requirements, etc.

However, regardless of the particular user scheduling objectives adopted by one or more of the data sending units 10, the teachings herein broadly provide data sending units 10 and respective data receiving units 12 with opportunities to operate at higher data rates than would be achieved absent predictive transmit link adaptation. That is, the teachings herein allow a given data receiving unit 12 to be informed of impending conditions of low interference, e.g., when one or more surrounding data sending units 10 indicate that they will be inactive in a future transmit interval. By recognizing such conditions, the data receiving unit 12 can be more aggressive in its computation of signal quality expected for that future transmit interval, and therefore will request a correspondingly higher data rate or report a correspondingly higher signal quality to be used by its supporting data sending unit 10 in that future transmit interval.

In a sense, then, the teachings herein represent a form of statistical transmit resource reuse (STRR), because the allocations of transmit resources at individual ones of the data sending units 10 change as a function of random packet arrivals. With STRR, the allocation of transmit resources is done in advance for future transmit intervals, based on the actual SINR levels expected at the data receiving units 12. In turn, the data receiving units 12 know with reasonably accuracy what SINR levels to expect for the future transmit intervals based on the future transmit resource allocation information signaled from the data sending units 10 in advance of those future intervals. STRR thus improves on traditional transmit resource reuse schemes, which commonly rely on the 90th percentile of SINR distribution, or some other generally conservative assumption about how reception conditions will or will not change between the time that a receiver measures and reports signal quality, and the time that a corresponding transmitter uses that report to adapt its transmit link to the receiver.

One interesting application of STRR is the ability to change the mix of data rates provided by the wireless communication network 8. Similar to GSM communication services with hopping, the wireless communication network 8 can be fractionally loaded through admission control, making it more likely that (packet data) queues for transmissions to data receiving units 12 will be empty (a form of time reuse). Having more numerous instances of empty transmit data queues changes the mix of data rates provided, allowing for higher rates to occur more often and in more places within given cells or sectors. Thus, if an operator of the wireless communication network 8 wants to improve coverage of services requiring higher rates, STRR with fractional loading can be used to achieve that objective.

With all of the above in mind, at least one embodiment of the overall process of STRR as taught herein comprises a number of steps. First, one or more data sending units 10 are configured to signal information related to what transmit resources they will allocate in the future. Such information can be any one or more of the following: an indicator of whether or not the data sending unit 10 will transmit a packet in a future transmit interval interest (e.g., a 1-bit flag); what power level (relative, absolute) the data sending unit 10 will use for transmitting one or more types of channels in a future transmit interval; what channelization resources will be used by the data sending unit 10 in a future transmit interval (spreading codes, OFDM frequencies, time slots); and what power levels will be used with different channelization resources. In at least one embodiment, the power level and channelization resources initially allocated and signaled by a given data sending unit 10 can be based on a worst case SINR estimate already available to the data sending unit 10 from periodic feedback provided by its associated data receiving units 12.

Next, individual data receiving units 12 use the future resource allocation information signaled by one or more of the surrounding data sending units 10 to determine link adaptation feedback, which may comprise sending a resource allocation request to a supporting one of the data sending units 10 based on the future resource allocation information received. More broadly, the request can be any one or more of the following: an overall data rate request; an overall power level request; identification of requested channelization resources, possibly with corresponding data rate and transmit power information. With regard to a given one of the data sending units 10, the next step is for the data sending unit 10 to allocate transmit resources based on the request(s) received by it from its supported data receiving units.

Figure 4:
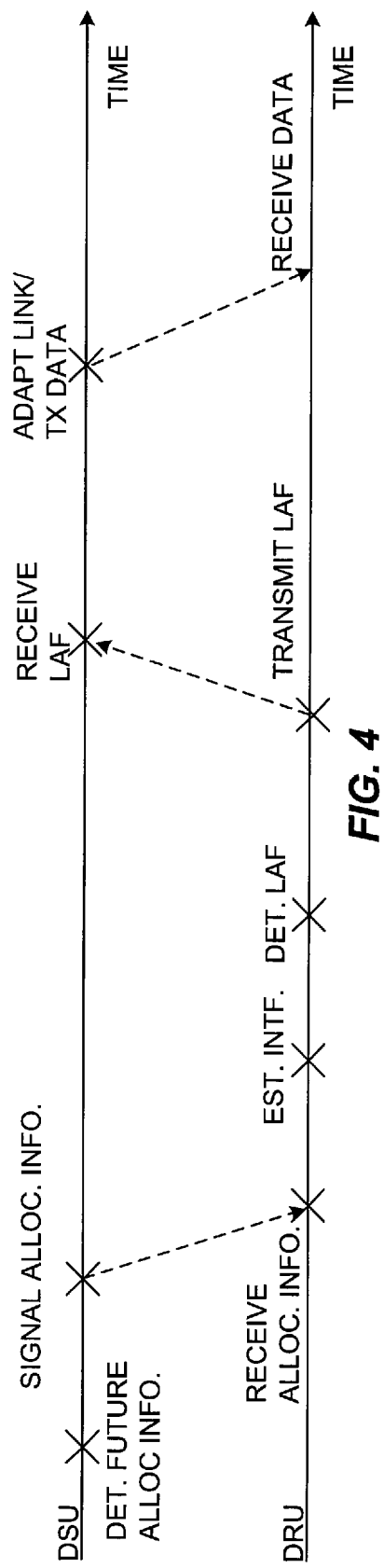
FIG. 4 is a timeline diagram for one embodiment of signaling between a data sending unit and a data receiving unit for predictive link adaptation.

FIG. 4 illustrates a timeline for such operations. Those skilled in the art are cautioned that FIG. 4 does not represent any precise time scale, or even relative timing, but rather is meant to illustrate the general sequence of operations between a given data sending unit 10 and a supported one of its data receiving unit 12.

According to the illustrated timeline, a data sending unit 10 (abbreviated as "DSU" in the diagram) determines a transmit resource allocation for a future transmit interval. As noted, the determination can be made by scheduling logic running on processing circuits within the data sending unit 10, according to dynamic or fixed user scheduling objectives. In any case, the DSU signals an indication of its future transmit resource allocation for the future transmit interval to a data receiving unit 12 (abbreviated as "DRU" in the diagram). Notably, the DRU can receive similar future allocation information from one or more other DSUs in the surrounding area, for the same or for other future transmit intervals. Indeed, it is not necessary for the DRU to receive future allocation information from the particular DSU supporting it. It may be more helpful, for example, for a given DRU to receive future transmit resource allocation from a non-supporting DSU representing the dominant source of other-cell interference for the DRU.

In any case, the DRU uses the future allocation information received from its supporting DSU and/or from one or more other DSUs, and uses that information to calculate expected interference for the corresponding future transmit interval. In turn, the expected interference levels provide a basis for the DRU to calculate link adaptation feedback (abbreviated "LAF" in the diagram) for the future transmit interval, which it transmits back to the supporting DSU in advance of the future transmit interval. Subsequently, i.e., when the future transmit interval comes to pass, the DSU uses the link adaptation feedback received for the DRU to adapt its transmission link to the DRU, assuming, of course, that that particular DRU is selected for service during the future transmit interval. (As previously noted, the DSU can commit to using particular transmit resources for the future transmit interval, but then wait until it receives the corresponding link adaptation feedback from the various DRUs it is supporting before deciding specifically how to apportion the allocated resources to particular DRUs for service during the future transmit interval.)

Figure 5:
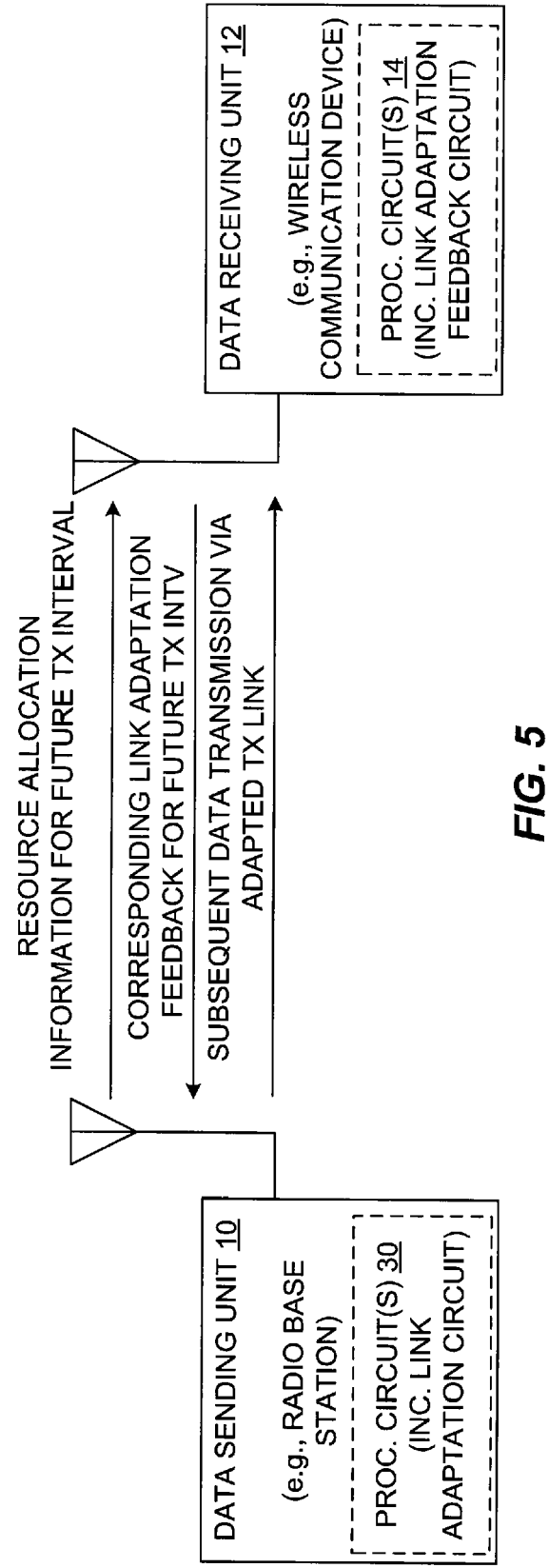
FIG. 5 is a block diagram of one embodiment of a data sending unit and a data receiving unit that include processing circuits configured to support predictive link adaptation.

FIG. 5 illustrates physical and/or logical circuit arrangements for a data sending unit 10 and a data receiving unit, in accordance with any one or more of the embodiments described above. The illustrated data receiving unit 12 comprises one or more processing circuits 14, one embodiment of which is detailed in FIG. 6.

Figure 6:
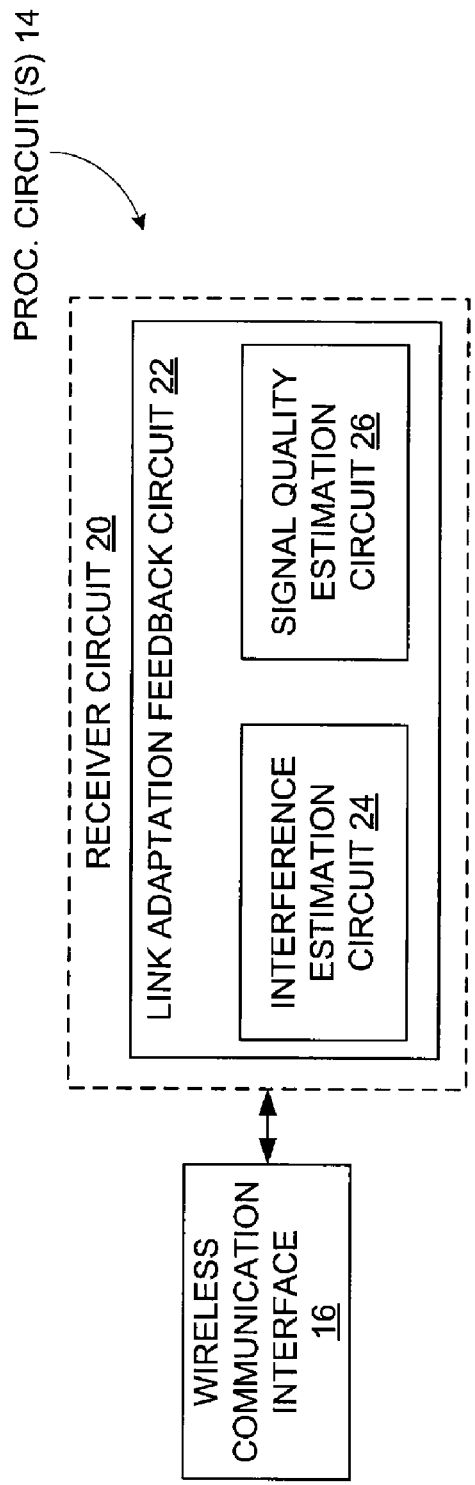
FIG. 6 is a block diagram of one embodiment of supporting circuit details for the data receiving unit illustrated in FIG. 5.

The circuit arrangement illustrated in FIG. 6 represents a non-limiting example, wherein a wireless communication interface 16 supports wireless communication with the wireless communication network 8, and includes various transmit and receive circuits, i.e., functions as a radiofrequency transceiver. In at least one case, the wireless communication interface 16 includes front-end receiver circuits which convert antenna-received signals into digital baseband samples that are input to a receiver circuit 20 for received signal processing, e.g., demodulation and decoding. The receiver circuit 20, which may be configured as a G-Rake receiver as discussed earlier herein, may comprise all or part of digital baseband processing circuit. Such a circuit may, as is known in the art, be implemented using one or more microprocessors, digital signal processors, FPGAs, ASICs, or other digital processing circuits. In such contexts, the functional logic of received signal processing may be embodied in hardware, software, or any combination thereof.

In at least one embodiment, the predictive link adaptation included in the STRR processing taught herein is embodied in a link adaptation feedback circuit 22, that is included in the receiver circuit 20, or that is associated with the receiver circuit 20. Thus, the link adaptation feedback circuit 22 may comprise hardware, software, or any combination thereof, and all or part of the processing logic associated with supporting predictive link adaptation may be embodied as computer program instructions held in a memory circuit included in or accessible to the link adaptation feedback circuit 22.

Further, an interference estimation circuit 24 and signal quality estimation circuit 26 represent logical circuit elements included in or associated with the link adaptation circuit 22. For example, the interference estimation circuit 24 is configured, in one or more embodiments, to carry out impairment correlation estimations for a future transmit interval based on the corresponding transmit resource allocations signaled by one or more data sending units 10.

In other words, the interference estimation circuit 24 may comprise part of G-Rake receiver processing carried out by the receiver circuit 20, and may implement Eq. (2) or Eq. (3). As such, the interference contributions of surrounding data sending units 10 for a future transmit interval is or is not considered (or is weighted or otherwise adjusted), as a function of the corresponding future transmit resource allocations signaled by those data sending units 10. A signal quality estimation circuit 26 uses the corresponding interference estimation to compute a measure of signal quality for the future transmit interval. The data receiving unit 12 may return the signal quality estimate to its data supporting unit 10 as the link adaptation feedback, or it may map or otherwise translate the computed signal quality into a channel quality indicator, a data rate request, or other corresponding, possibly quantized value that is tied to the signal quality expected for the future transmit interval.

Figure 7:
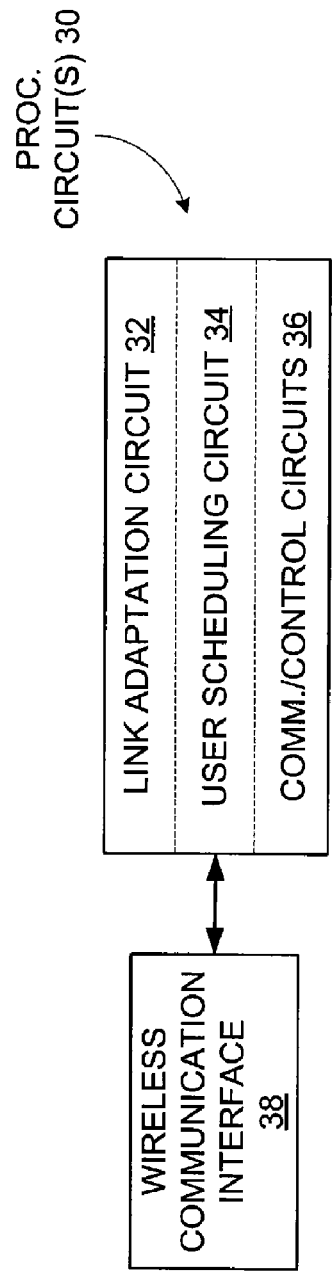
FIG. 7 is a block diagram of one embodiment of supporting circuit details for the data sending unit illustrated in FIG. 5.

Returning to FIG. 5 momentarily, one sees that an embodiment of the data sending unit 10 similarly includes one or more processing circuits 30, which, as shown in FIG. 7, include a link adaptation circuit 32, a user scheduling circuit 34, and communication/control circuits 36. As with the data receiving unit 12, these processing and control circuits may be implemented or supported by logical circuit structures implemented within the data sending unit 10, using hardware, software, or any combination thereof.

For example, the link adaptation circuit 32 may be configured to support predictive link adaptation as taught herein by executing corresponding computer instructions on one or more microprocessors, digital signal processors, or other digital processing elements. Likewise, the disadvantaged-user and fractional-resource loading aspects of predictive link adaptation may be incorporated into the operations of the user scheduling circuit 34 through appropriate hardware and/or software provisions.

Similarly, the communication/control circuits 36, which provide transmit/receive data processing may be implemented in hardware or software, and may communicate with the user scheduling and link adaptation circuits 34 and 32, respectively, such as for assistance in collecting incoming packet data to be transmitted to targeted data receiving units 12, and/or to for tracking packet data queue sizes. In any case, any or all such circuits may be communicatively coupled, directly or indirectly, to a wireless communication interface 38 that supports communication with the (remote) data receiving units 12. In at least one embodiment, the data sending unit 10 is a radio base station and the wireless communication interface 38 includes radiofrequency transceiver circuits configured, for example, according to WCDMA air interface standards.

In general, those skilled in the art will appreciate that the wireless communication network 8 may comprise a WCDMA network offering HSPDA services, or offering Orthogonal Frequency Division Multiplexing (OFDM) in accordance with developing "Super3G" or "Long Term Evolution" (LTE) and WiMAX standards. Of course, the network 8 may be configured according to essentially any standard or air interface protocol, including WiMAX and any number of the developing "4G" wireless communication standards. The data sending units 10 and data receiving units 12 will be configured accordingly. In WiMAX, a transmit interval may correspond to a frame.

Thus, in one or more embodiments, the data receiving units 12 comprises wireless communication devices configured for operation in a WiMAX or LTE wireless communication network. In such embodiments, receiving indications of future transmit resource allocations to be used by one or more data sending units 10 in a future transmit interval may comprise receiving indications of future transmit resource allocations from one or more base stations in the WiMAX or LTE wireless communication network for a future Transmit Time Interval (TTI) or frame of a WiMAX or LTE air interface.

With these non-limiting examples in mind, it will be appreciated that predictive link adaptation as a basis for STRR, along with the complementary methods of disadvantaged user compensation and fractional resource loading, broadly apply to a range of communication network types. Further, it should be understood that, while the above descriptions and examples focus on downlink processing, the methods and apparatus taught herein also can be applied to adaptation of the uplink transmit links between data receiving units 12 and data sending units 10. For example, a data sending unit 10 can be configured to "listen" for announcements from data receiving units 12 in nearby cells or sectors announcing that they are about to send packet data. By tracking the power levels used by those data receiving units 12 to send packet data, the data sending unit 10 can compute a SINR (or other signal quality measurement), and adapt uplink data rates accordingly.

Thus, the foregoing description and the accompanying drawings represent non-limiting examples of the methods and apparatus taught herein for predictive link adaptation. As such, the present invention is not limited by the foregoing description and accompanying drawings. Instead, the present invention is limited only by the following claims and their legal equivalents.

What is claimed is:

1. A method of link adaptation in a wireless communication network comprising:

signaling future channelization resource allocation information corresponding to channelization resource allocations to be used by one or more data sending units in a future transmit interval, so that nearby data receiving units can predict interference for the future transmit interval for their interference-based determinations of link adaptation feedback for the future transmit interval;

at a given data sending unit, receiving link adaptation feedback for the future transmit interval from an associated one of the data receiving units, said link adaptation feedback based on interference predicted by the associated data receiver unit for the future transmit interval according to the future channelization resource allocation information signaled to the associated data receiving unit; and subsequently, in the future transmit interval, adapting a transmission link at the given data sending unit for the associated data receiving unit according to the link adaptation feedback.

2. The method of claim 1, further comprising synchronizing transmit intervals across the one or more data sending units, such that the future transmit interval occurs substantially synchronously across the data sending units.

3. The method of claim 2, further comprising signaling the future transmit resource allocation from each of the data sending units for the future transmit interval.

4. The method of claim 1, wherein signaling future channelization resource allocation information comprises signaling channelization resource allocations to be used by one or more data sending units in the future transmit interval.

5. The method of claim 4, wherein signaling channelization resource allocations to be used by the data sending unit in the future transmit interval comprises sending information identifying channelization codes or channelization frequencies to be used by one or more data sending units in the future transmit interval.

6. The method of claim 4, wherein signaling channelization resource allocations to be used by one or more data sending units in the future transmit interval comprises sending information identifying at least one of transmit data rates and transmit power allocations to be used with one or more channelization codes or channelization frequencies in the future transmit interval.

7. The method of claim 1, further comprising, at one or more of the data sending units, determining the future transmit resource allocations based on a scheduling objective biased toward improving service to data receiving units in disadvantaged reception conditions.

8. The method of claim 1, further comprising, at one or more of the data sending units, determining channelization resource allocations for the future transmit interval based on knowledge of radio conditions for associated ones of the data receiving units that are candidates for being served in the future transmit interval.

9. The method of claim 1, wherein, at the given data sending unit, receiving link adaptation feedback for the future transmit interval from an associated one of the data receiving units comprises receiving at least one of a signal quality measurement, a channel quality indicator, a resource preference, and a data rate request.

10. The method of claim 1, wherein the data sending units comprise radio base stations configured for operation in a Wideband Code Division Multiple Access (WCDMA) communication network, and wherein signaling future channelization resource allocation information corresponding to channelization resource allocations to be used by one or more data sending units in a future transmit interval comprises signaling future transmit channelization resource allocation information for a future Transmit Time Interval (TTI).

11. The method of claim 1, wherein in the future transmit interval, adapting a transmission link at the given data sending unit for the associated data receiving unit according to the link adaptation feedback comprises transmitting data from the data sending unit to the data receiving unit using a format based on the link adaptation feedback.

12. The method of claim 1, further comprising signaling the future channelization resource allocation information using a signal power greater than that allocated to other control signals transmitted by the data sending unit, thereby enhancing reception of the signaled channelization resource control information for those data receiving units outside of reliable control signaling reception but still subject to interference caused by the data sending unit.

13. A data sending unit for use in a wireless communication network comprising one or more processing circuits configured to:

signal future channelization resource allocation information corresponding to channelization resource allocations to be used by one or more data sending units in a future transmit interval, so that nearby data receiving units can predict interference for the future transmit interval for their interference-based determinations of link adaptation feedback for the future transmit interval;

receive link adaptation feedback for the future transmit interval from an associated data receiving unit, said link adaptation feedback based on interference predicted by the associated data receiving unit for the future transmit interval according to the future channelization resource allocation information signaled to the associated data receiving unit; and subsequently adapt a transmission link for the associated data receiving unit in the future transmit interval according to the link adaptation feedback.

14. The data sending unit of claim 13, wherein the data sending unit comprises a radio base station configured for operation in a wireless communication network.

15. The data sending unit of claim 13, wherein the data sending unit further comprises a wireless communication interface configured for transmitting signals to data receiving units and receiving signals from the data receiving units, and wherein the one or more processing circuits comprise a scheduling controller configured to determine the future channelization resource allocation information for the future transmit interval and to cause the future channelization resource allocation information to be signaled via the wireless communication interface, and a link adaptation controller configured to adapt the transmission link for the associated data receiving unit in the future transmit interval according to the link adaptation feedback.

16. The data sending unit of claim 13, wherein the data sending unit is configured to operate as one in a plurality of data sending units, and to synchronize its transmit intervals relative to one or more other data sending units in the plurality of data sending units, such that the future transmit interval occurs substantially synchronously across the data sending units.

17. The data sending unit of claim 13, wherein the one or more processing circuits of the data sending unit are configured to signal the future channelization resource allocation information for the future transmit interval by transmitting channelization resource allocations to be used by one or more data sending units in the future transmit interval.

18. The data sending unit of claim 17, wherein the one or more processing circuits of the data sending unit are configured to transmit the channelization resource allocation information by sending information identifying channelization codes or channelization frequencies to be used by one or more data sending units in the future transmit interval.

19. The data sending unit of claim 17, wherein the one or more processing circuits of the data sending unit are configured to transmit the channelization resource allocation information by sending information identifying at least one of transmit data rates and transmit power allocations to be used with one or more channelization codes or channelization frequencies in the future transmit interval.

20. The data sending unit of claim 13, wherein the one or more processing circuits of the data sending unit are configured to determine the future channelization resource allocations for the future transmit interval based on a scheduling objective biased toward improving service to data receiving units in disadvantaged reception conditions.

21. The data sending unit of claim 13, wherein the one or more processing circuits of the data sending unit are configured to determine future channelization resource allocations for the future transmit interval based on knowledge of radio conditions for associated data receiving units that are candidates for being served by the data sending unit in the future transmit interval.

22. The data sending unit of claim 13, wherein the one or more processing circuits of the data sending unit are configured to receive the link adaptation feedback as at least one of a signal quality measurement, a channel quality indicator, a resource preference and a data rate request.

23. The data sending unit of claim 13, wherein the one or more processing circuits of the data sending unit are configured to adapt a transmission link for the associated data receiving unit in the future transmit interval according to the link adaptation feedback by transmitting data from the data sending unit to the data receiving unit using a format based on the link adaptation feedback.

24. The data sending unit of claim 13, wherein the data sending unit is configured to signal the future channelization resource allocation information using a signal power greater than that allocated to other control signals transmitted by the data sending unit, thereby enhancing reception of the signaled channelization resource allocation information for those data receiving units outside of reliable control signaling reception but still subject to interference caused by the data sending unit.

25. In a data receiving unit configured for operation in a wireless communication network having multiple data sending units, a method of supporting link adaptation comprising:
  receiving indications of future channelization resource allocations to be used by one or more data sending units in a future transmit interval;
  determining link adaptation feedback for the future transmit interval by predicting interference conditions for the future transmit interval based on the indications of future channelization resource allocations; and
  transmitting the link adaptation feedback for the future transmit interval to a supporting one of the data sending units.

26. The method of claim 25, wherein receiving indications of future channelization resource allocations to be used by one or more data sending units in a future transmit interval comprises receiving an indication of future channelization resource allocations for the future transmit interval from each in a number of data sending units.

27. The method of claim 25, wherein the indications of future channelization resource allocations comprise, for each of one or more data sending units, channelization resource allocation information for the future transmit interval, and wherein predicting interference conditions for the future transmit interval based on the indications of future transmit resource allocations comprises estimating interference contributions of individual data sending units based on the corresponding channelization resource allocation information.

28. The method of claim 25, wherein receiving indications of future channelization resource allocations to be used by one or more data sending units in a future transmit interval comprises receiving channelization resource allocation information for the future transmit interval for each in a number of data sending units.

29. The method of claim 28, wherein predicting interference conditions for the future transmit interval based on the indications of future channelization resource allocations comprises estimating interference contributions of each data sending unit in the number of data sending units for the future transmit interval based on the future channelization resource allocations.

30. The method of claim 29, wherein the channelization resource allocations comprise at least one of channelization code allocations and channelization frequency allocations, and wherein estimating interference contributions of each data sending unit in the number of data sending units for the future transmit interval based on the future channelization resource allocations comprises determining signal quality based on knowledge of the corresponding channelization code or channelization frequency allocations.

31. The method of claim 25, wherein transmitting the link adaptation feedback for the future transmit interval to a supporting one of the data sending units comprises transmitting at least one of a signal quality measurement, a channel quality indicator, and a data rate request to the supporting data sending unit.

32. The method of claim 25, wherein the data receiving unit comprises a wireless communication device configured for operation in a Wideband Code Division Multiple Access (WCDMA) wireless communication network, and wherein receiving indications of future channelization resource allocations to be used by one or more data sending units in a future transmit interval comprises receiving indications of future channelization resource allocations from one or more base stations in the WCDMA wireless communication network for a future Transmit Time Interval (TTI) of a WCDMA air interface.

33. The method of claim 25, wherein the data receiving unit comprises a wireless communication device configured for operation in a WiMAX or LTE wireless communication network, and wherein receiving indications of future channelization resource allocations to be used by one or more data sending units in a future transmit interval comprises receiving indications of future channelization resource allocations from one or more base stations in the WiMAX or LTE wireless communication network for a future Transmit Time Interval (TTI) or frame of a WiMAX or LTE air interface.

34. A data receiving unit configured for operation in a wireless communication network having a number of data sending units, the data receiving unit comprising one or more processing circuits configured to:
  receive indications of future channelization resource allocations to be used by one or more data sending units in a future transmit interval;
  determine link adaptation feedback for the future transmit interval by predicting interference conditions for the future transmit interval based on the indications of future channelization resource allocation; and
  transmit the link adaptation feedback for the future transmit interval to a supporting one of the data sending units.

35. The data receiving unit of claim 34, wherein the one or more processing circuits of the data receiving unit are configured to receive an indication of future channelization resource allocations for the future transmit interval from each in a number of data sending units.

36. The data receiving unit of claim 34, wherein the indications of future channelization resource allocations comprise, for each of one or more data sending units, an indication of whether the data sending unit will be active with respect to one or more types of transmission in the future transmit interval, and wherein the one or more processing circuits of the data receiving unit are configured to predict the interference conditions for the future transmit interval based on considering or not considering an interference contribution of individual data sending units according to the corresponding indication of whether the data sending unit will be active.

37. The data receiving unit of claim 34, wherein the indications of future channelization resource allocations comprise, for each of one or more data sending units, channelization resource allocation information for the future transmit interval, and wherein the one or more processing circuits of the data receiving unit are configured to predict the interference conditions for the future transmit interval by estimating interference contributions of individual data sending units according to the corresponding channelization resource allocation information.

38. The data receiving unit of claim 34, wherein the one or more processing circuits of the data receiving unit are configured to receive channelization resource allocation information for each in a number of data sending units as the indications of future channelization resource allocations for the future transmit interval.

39. The data receiving unit of claim 38, wherein the one or more processing circuits of the data receiving unit are configured to predict interference conditions for the future transmit interval by, for each data sending unit for which an indication of future transmit resource allocation was received, estimating an interference contribution of the data sending unit for the future transmit interval based on the corresponding channelization resource allocation information.

40. The data receiving unit of claim 39, wherein the channelization resource allocation information comprises at least one of channelization code allocations and channelization frequency allocations, and wherein the one or more processing circuits of the data receiving unit are configured to estimate the interference contribution of each data sending unit for the future transmit interval by determining signal quality based on knowledge of the channelization code or channelization frequency allocations.

41. The data receiving unit of claim 34, wherein the one or more processing circuits of the data receiving unit are configured to transmit the link adaptation feedback for the future transmit interval to a supporting one of the data sending units by transmitting at least one of a signal quality measurement, a channel quality indicator, and a data rate request to the supporting data sending unit.

42. The data receiving unit of claim 34, wherein the data receiving unit comprises a wireless communication device configured for operation in a Wideband Code Division Multiple Access (WCDMA) wireless communication network, and wherein receiving indications of future channelization resource allocations to be used by one or more data sending units in a future transmit interval comprises receiving indications of future channelization resource allocations from one or more base stations in the WCDMA wireless communication network for a future Transmit Time Interval (TTI) of a WCDMA air interface.

43. The data receiving unit of claim 34, wherein the data receiving unit includes a wireless communication interface configured to support wireless communication with one or more base stations in the wireless communication network, and wherein the one or more processing circuits are operatively associated with the wireless communication interface and include a link adaptation feedback circuit that is configured to compute the link adaptation feedback for the future transmit interval.

44. The data receiving unit of claim 43, wherein the link adaptation feedback circuit includes an interference estimation circuit and a signal quality estimation circuit.

* * * * *

UNITED STATES PATENT AND TRADEMARK OFFICE
CERTIFICATE OF CORRECTION

| | | |
|---|---|---|
| PATENT NO. | : 7,899,015 B2 | Page 1 of 1 |
| APPLICATION NO. | : 11/681302 | |
| DATED | : March 1, 2011 | |
| INVENTOR(S) | : Bottomley et al. | |

It is certified that error appears in the above-identified patent and that said Letters Patent is hereby corrected as shown below:

In Column 4, Line 50, delete "(TTIs)." and insert -- (TTIs). --, therefor.

In Column 9, Line 59, delete "device" and insert -- device. --, therefor.

In Column 11, Line 59, delete "a" and insert -- $\alpha$ --, therefor.

In Column 19, Line 8, in Claim 20, after "to determine" delete "the".

Signed and Sealed this
Nineteenth Day of July, 2011

David J. Kappos
*Director of the United States Patent and Trademark Office*